Nov. 15, 1955     M. LORENZ ET AL     2,723,839

MIXING BOWL

Filed March 4, 1953

INVENTORS
Max Lorenz
Hans Voigt
Eugen Walch
by Stevens Davis, Miller & Mosher
their attorneys

United States Patent Office 2,723,839
Patented Nov. 15, 1955

2,723,839
MIXING BOWL

Max Lorenz, Leonberg, Hans Voigt, Stuttgart, and Eugen Walch, Ditzingen, Germany, assignors to Robert Bosch G. m. b. H., Stuttgart, Germany Application March 4, 1953, Serial No. 340,299

Claims priority, application Germany March 27, 1952

7 Claims. (Cl. 259—108)

The invention concerns a mixing bowl, more particularly for dough, or the like, having a mechanically driven stirring device or mechanism which is coupled, detachably if required, with a driving member mounted in the base of the bowl.

In order to seal the passage where the driving member extends through the base of the bowl and in addition to render possible the use of the mixing bowl for other purposes, the driving member terminates, according to the present invention, just above the base of the bowl and carries a collar or flange which is maintained in sealing contact with the confronting face of a bearing member or bushing secured to the base of the bowl. This arrangement not only ensures a clean, hygenic and reliable sealing of the passage in the base of the bowl, but also largely eliminates the inconvenience of substantially projecting parts in the bowl which might interfere with the use of the bowl for other purposes, and which may also hinder the cleaning of the bowl after a mixing operation.

With a view to obtaining a particularly favourable sealing effect, the sealing ring is preferably made from a polyplast material, more particularly a polyamide. With the use of this material, the cooperating bearing surfaces or the parts which slide over one another do not require any lubricant and do not cause discoloration of the food being mixed, which may for example, easily occur in the case of metallic sliding elements of known kitchen appliance.

The invention is further described with reference to the accompanying drawings which illustrate a preferred embodiment of the invention by way of example only and in which.

Figure 1:
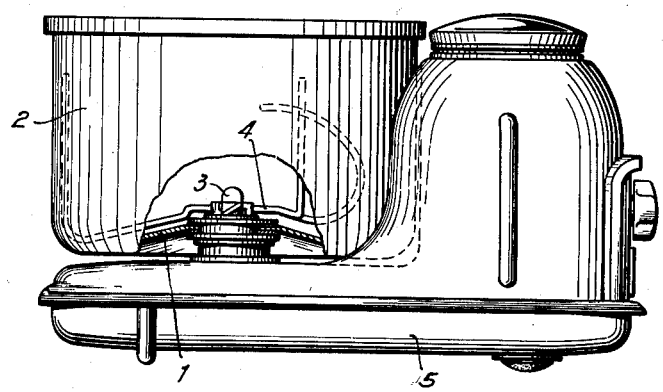
Fig. 1 is a side elevation of a supporting and driving apparatus for domestic kitchen machines or appliances with a mixing bowl mounted thereon, the bowl being shown partly in section.

In the drawings, on the base 1 of the mixing bowl 2 there is rotatably mounted a driving member 3 of stainless steel or any other suitable metal on which a stirring device, such as designated 4 may be easily detachably mounted for rotation in the bowl by the driving member 3. For driving the stirring device 4, the bowl is placed on a supporting and driving apparatus generally designated 5 in such a manner that the driving member 3 in the base of the bowl becomes coupled with the corresponding driving shaft, or the like, provided on the apparatus 5.

The driving member 3 carries a circular disc-like flange 6 which is situated just above the base of the bowl. The flange 6 has a downwardly directed rim which is maintained in sealing contact with the top face of a bearing member 7 which consists of the polyamide known under the trade name "Perlon." The bearing member 7 is supported on a sealing ring 8 disposed on the base 1 of the bowl around the central aperture therein and is provided with an annular bushing 9 which extends through the said aperture in the base of the bowl. This bushing 9 has an external threaded portion on which a nut 10 is screwed. Disposed between the nut 10 and the underside of the base of the bowl is a metal joint washer or ring 11. By screwing the nut 10 tightly against the metal ring 11, the bearing member 7, 9 becomes firmly secured to the base of the bowl 1. The bushing 9 of the member 7, 9 also has an internal threaded portion 12 which provides an optional means for the securing of the mixing bowl on the supporting and driving apparatus 5. For instance the threaded portion 12 may be screwed on to a correspondingly external screw thread of a bush or sleeve enclosing the driving shaft or spindle of the supporting and driving apparatus.

A shaft member 13 is rotatably mounted in an axial bore of the bearing member 7 and has a threaded pin extension 14 which is screwed into the driving member 3. The lower end of shaft 13 is provided with a coupling lug 15 suitable for engagement with a corresponding driving member of the driving apparatus 5. Interposed between a shoulder or flange 16 of the shaft member 13 and the end face of a hub portion 17 of the bearing member 7 is a resilient ring 18. By screwing the shaft member 13, 14 into the driving member 3 the resilient ring 18 may be put under the desired tension whereby to cause the collar or flange 6 of the driving member 3 to be drawn against the bearing member 7 with a certain amount of bearing pressure.

The bushing 9 of the bearing member 7, engaging through the base of the bowl has three spaced projections 19 which engage in correspondingly spaced cut-out portions 20 formed in the base of the bowl 1, whereby to prevent rotation of the bearing member relative to the bowl. The bearing member 7, 9 may also consist of the polyamide known under the trade name "nylon" or even of any other material belonging to the group of polyplasts. The particular advantage of the use of these materials is that they require no lubrication as do metallic sliding or bearing surfaces, always retain a good appearance and above all no discoloration of the food which is being mixed in the bowl occurs upon contact with the sliding surfaces.

The bearing member 7, 9 could, however, also consist of any suitable metal such, for example, as brass, or the like.

Figure 2:
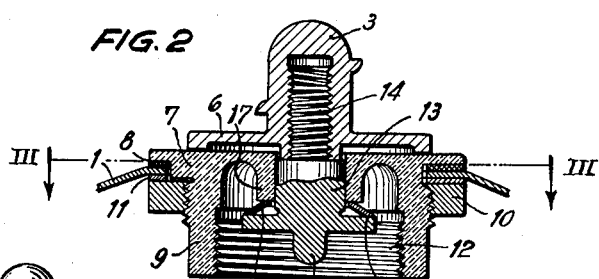
Fig. 2 is a detail section, drawn to an enlarged scale as compared with Fig. 1, through the driving member attached to the base of the bowl.
Figure 4:
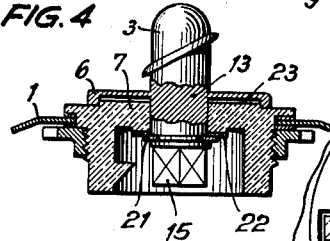
Fig. 4 is a detail section, on a smaller scale as compared with Fig. 2, of a modified form of driving member mounted on the base of the bowl.
Figure 3:
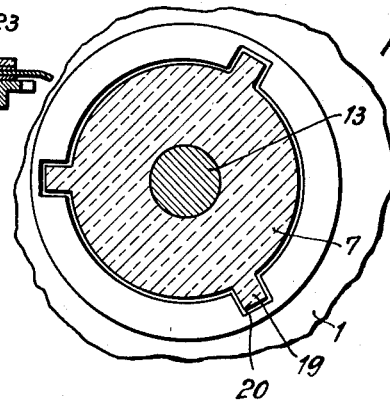
Fig. 3 is a sectional plan view taken on the line III—III of Fig. 2.

In the modification shown in Fig. 4, the parts corresponding to Fig. 2 are given the same reference numerals. In this modification, the main difference is that the driving member 3, the shaft member 13 and the coupling element 15 consist of an integral unit. The shaft 13 of the driving member is inserted from above into the guide bore of the bearing part 7. A spring ring 21 and a washer 22 prevent axial displacement of the driving members 3, 13, 15. Incidentally, the rim of the collar or flange 6 is spaced a substantial distance from the axis of the driving member 3 and engages behind an annular shoulder 23 formed by stepping the top face of the bearing part 7, whereby the driving member is supported particularly well against lateral displacement and tilting action.

We claim:

1. A mixing apparatus for stirring dough and mixing other food stuffs comprising a bowl having a bottom provided with an aperture, a bearing member positioned in said aperture, means fixedly securing the bearing member in the aperture to close off the aperture, said bearing member protruding above the inside of the bottom and having a flat upper bearing face which overlies the aperture and the portion of the bottom adjacent the aperture, said bearing member having a vertical opening, a driving member for a stirring means positioned in said opening and extending above the bearing face, a laterally extending annular flange on said driving member overlying the bearing face and a depending peripheral rim on said flange sealingly riding on the bearing face in intimate contact therewith.

2. A mixing apparatus for stirring dough and mixing other food stuffs comprising a bowl having a bottom provided with an aperture, a bearing member positioned in said aperture, means fixedly securing the bearing member in the aperture to close off the aperture, said bearing member protruding above the inside of the bottom and having a flat upper bearing face which overlies the aperture and the portion of the bottom adjacent the aperture, said bearing member having a vertical opening, a driving member for a stirring means positioned in said opening and extending above the bearing face, a laterally extending annular flange on said driving member overlying the bearing face and a depending peripheral rim on said flange sealingly riding on the bearing face in intimate contact therewith, said bearing face being formed of a material of the group of materials of polyplasts.

3. A mixing apparatus as claimed in claim 2, wherein said material of the bearing face is a polyamide.

4. A mixing apparatus as claimed in claim 1, wherein said bearing member has a hub concentric to the opening and depending below the bottom of the bowl and said driving member has a threaded axial bore, a shaft member positioned in said hub and threaded in said bore and having a shoulder opposing the end of the hub having means for attachment to a driving apparatus and a resilient ring circumposed on the driving lug and compressed between the hub and the shoulder to draw the rim of the flange tightly on to the bearing face.

5. A mixing apparatus as claimed in claim 1, wherein said driving member has an integral coupling member depending below the bottom of the bowl and means is provided for preventing axial displacement of the driving and coupling member.

6. A mixing apparatus as claimed in claim 1, wherein said bearing face has a stepped shoulder radially inward of its periphery and said rim engages concentrically on the shoulder.

7. A mixing apparatus as claimed in claim 1, wherein said bearing member has a tubular extension depending below the bottom of the bowl and having internal threads for attachment to the external threads of a bushing for a driving shaft of a driving apparatus.

References Cited in the file of this patent
UNITED STATES PATENTS

| | | |
|---|---|---|
| 1,681,464 | Cameto | Aug. 21, 1928 |
| 1,927,184 | Poplawski | Sept. 19, 1933 |
| 2,226,372 | Cravaritis | Dec. 24, 1940 |
| 2,335,002 | Eppenbach et al. | Nov. 23, 1943 |
| 2,487,803 | Heilmann | Nov. 15, 1949 |